United States Patent
Wachsmuth

(10) Patent No.: US 11,788,303 B2
(45) Date of Patent: Oct. 17, 2023

(54) TEMPLATING DEVICE

(71) Applicant: Robin Wachsmuth, Brainerd, MN (US)

(72) Inventor: Robin Wachsmuth, Brainerd, MN (US)

( * ) Notice: Subject to any disclaimer, the term of this patent is extended or adjusted under 35 U.S.C. 154(b) by 253 days.

(21) Appl. No.: 17/323,619

(22) Filed: May 18, 2021

(65) Prior Publication Data

US 2022/0372769 A1 Nov. 24, 2022

(51) Int. Cl.
*G01B 3/56* (2006.01)
*E04F 21/00* (2006.01)

(52) U.S. Cl.
CPC .......... *E04F 21/0015* (2013.01); *G01B 3/563* (2013.01)

(58) Field of Classification Search
CPC ........ E04F 21/0015; G01B 3/563; G01B 3/08
See application file for complete search history.

(56) References Cited

U.S. PATENT DOCUMENTS

| | | | | |
|---|---|---|---|---|
| 1,489,789 A * | 4/1924 | Ryan | ...................... | E04F 21/26 33/461 |
| 1,624,535 A * | 4/1927 | Christianson | ........... | E04F 21/26 33/461 |
| 3,851,868 A * | 12/1974 | Lagasse | .............. | E04F 21/0015 269/208 |
| 5,713,135 A | 2/1998 | Acopulos | | |
| D395,249 S | 6/1998 | Lindstrom | | |
| 6,418,631 B1 * | 7/2002 | Ramsthaler | ............. | B43L 13/00 33/809 |
| 6,732,445 B1 * | 5/2004 | Scoville | .................. | F16L 55/18 33/645 |
| 6,742,271 B1 | 6/2004 | Rushing | | |
| 6,820,342 B2 * | 11/2004 | Ramsthaler | ............ | B43K 23/00 33/809 |
| 6,966,119 B1 * | 11/2005 | Dlugoleski | .............. | G01C 9/26 33/562 |
| 7,204,031 B2 | 4/2007 | Hanson | | |
| 7,908,755 B2 | 3/2011 | Rushing | | |
| 9,021,713 B1 * | 5/2015 | Pierson | ..................... | B43L 7/10 33/529 |
| 9,920,539 B1 | 3/2018 | Butts | | |
| 10,265,843 B2 * | 4/2019 | Young | ...................... | B25H 7/00 |
| 2005/0115091 A1 * | 6/2005 | Harris | ................. | E04F 21/0076 33/461 |
| 2015/0191039 A1 | 7/2015 | Johnson | | |

(Continued)

FOREIGN PATENT DOCUMENTS

WO      WO9847720      10/1998

*Primary Examiner* — Yaritza Guadalupe-McCall

(57) ABSTRACT

A templating device for preparing beams includes a rod that has opposed ends, each of which is both slidably engageable and fixedly engageable to a first segment of a respective protractor of a pair of protractors, such that the first segment extends linearly from the rod. The first segment is pivotally engaged to a second segment, which is selectively fixably positionable relative to the first segment. The rod and the first segments are positioned between a pair of surfaces, with each second segment positioned flush to a respective surface. A user fixes the second segment relative to the first segment to provide a respective angle measurement and a length measurement between the surfaces, and then templates these measurements onto a beam. The user then can cut the beam to length, with the ends of the beam angled so that the beam fits between the pair of surfaces.

16 Claims, 5 Drawing Sheets

(56) References Cited

U.S. PATENT DOCUMENTS

| | | | |
|---|---|---|---|
| 2015/0300031 A1* | 10/2015 | Tilberg | E04F 21/0015 81/485 |
| 2016/0024791 A1* | 1/2016 | Reno | E04C 3/02 52/745.21 |
| 2022/0372769 A1* | 11/2022 | Wachsmuth | E04F 21/0015 |

* cited by examiner

TEMPLATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to templating devices and more particularly pertains to a new templating device for preparing beams.

(2) Description of Related Art Including Information Disclosed Under 37 CFR 1.97 and 1.98

The prior art relates to templating devices. Prior art devices may comprise an angle measurement device in combination with a fixed length measuring device. The prior art does not teach an adjustable length measuring device having angle measurement devices engaged to both ends.

BRIEF SUMMARY OF THE INVENTION

An embodiment of the disclosure meets the needs presented above by generally comprising a pair of protractors and a rod that has opposed ends. Each protractor comprises a first segment, which is pivotally engaged to a second segment. The second segment is selectively fixably positionable relative to the first segment. Each opposed end is configured both to slidably engage and to fixedly engage a first segment of a respective protractor, such that each opposed end has a protractor engaged proximately thereto with an associated first segment extending linearly therefrom. Thus, the rod and the first segments have an adjustable and selectively fixable overall length. The rod and the first segments are configured to be positioned between a pair of surfaces, with each second segment positioned flush to a respective surface. A user is positioned to fix the second segment relative to the first segment to provide a respective angle measurement and a length measurement between the surfaces. The user then is positioned to template the length measurement and the angle measurements onto a beam. The user then can cut the beam to length, with the ends of the beam angled so that the beam fits between the pair of surfaces.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
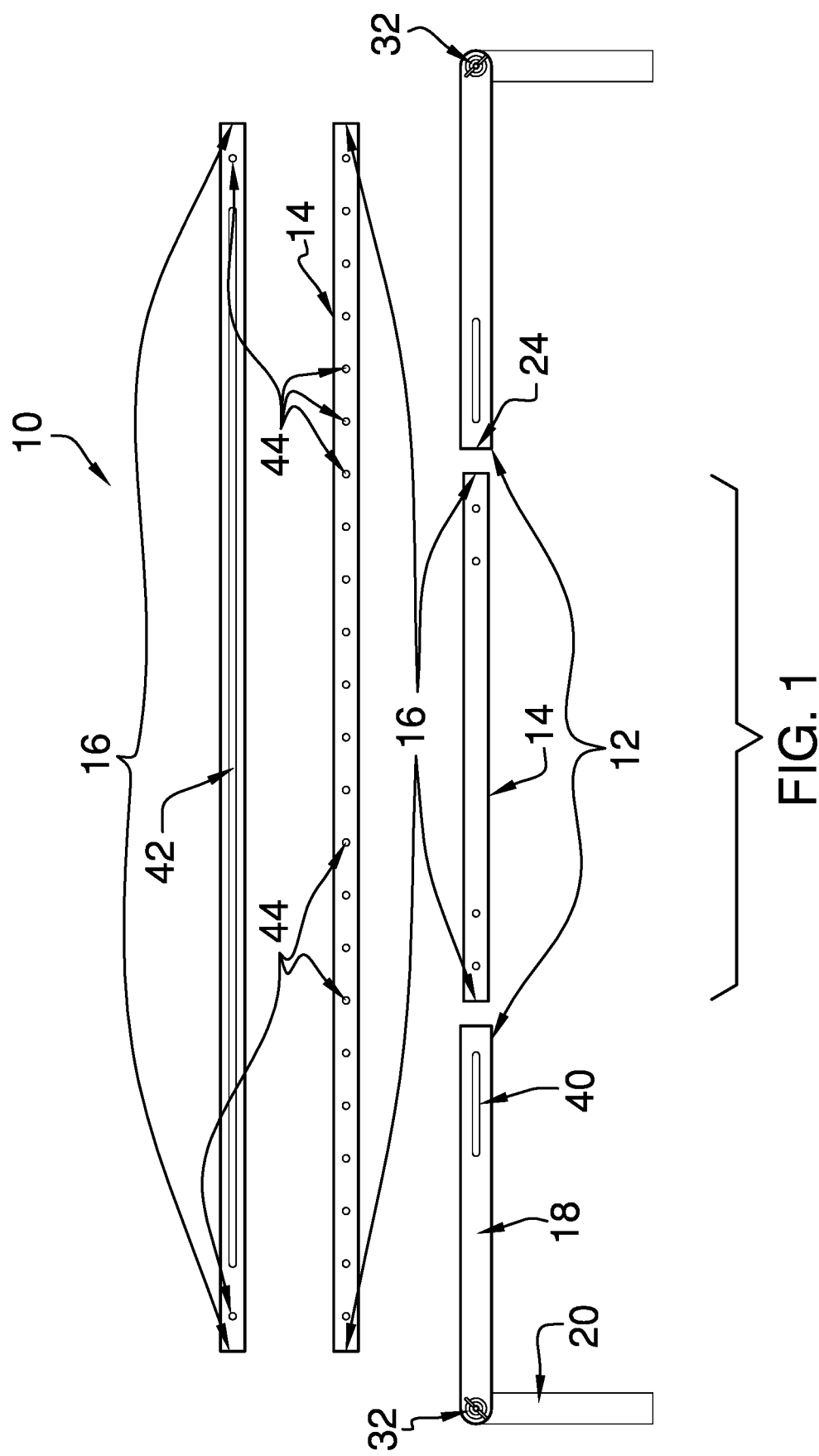
FIG. 1 is a kit view of a templating device according to an embodiment of the disclosure.

With reference now to the drawings, and in particular to FIGS. 1 through 5 thereof, a new templating device embodying the principles and concepts of an embodiment of the disclosure and generally designated by the reference numeral 10 will be described.

As best illustrated in FIGS. 1 through 5, the templating device 10 generally comprises a pair of protractors 12 and a rod 14 that has opposed ends 16. Each protractor 12 comprises a first segment 18, which is pivotally engaged to a second segment 20. The second segment 20 is selectively fixably positionable relative to the first segment 18.

Figure 2:
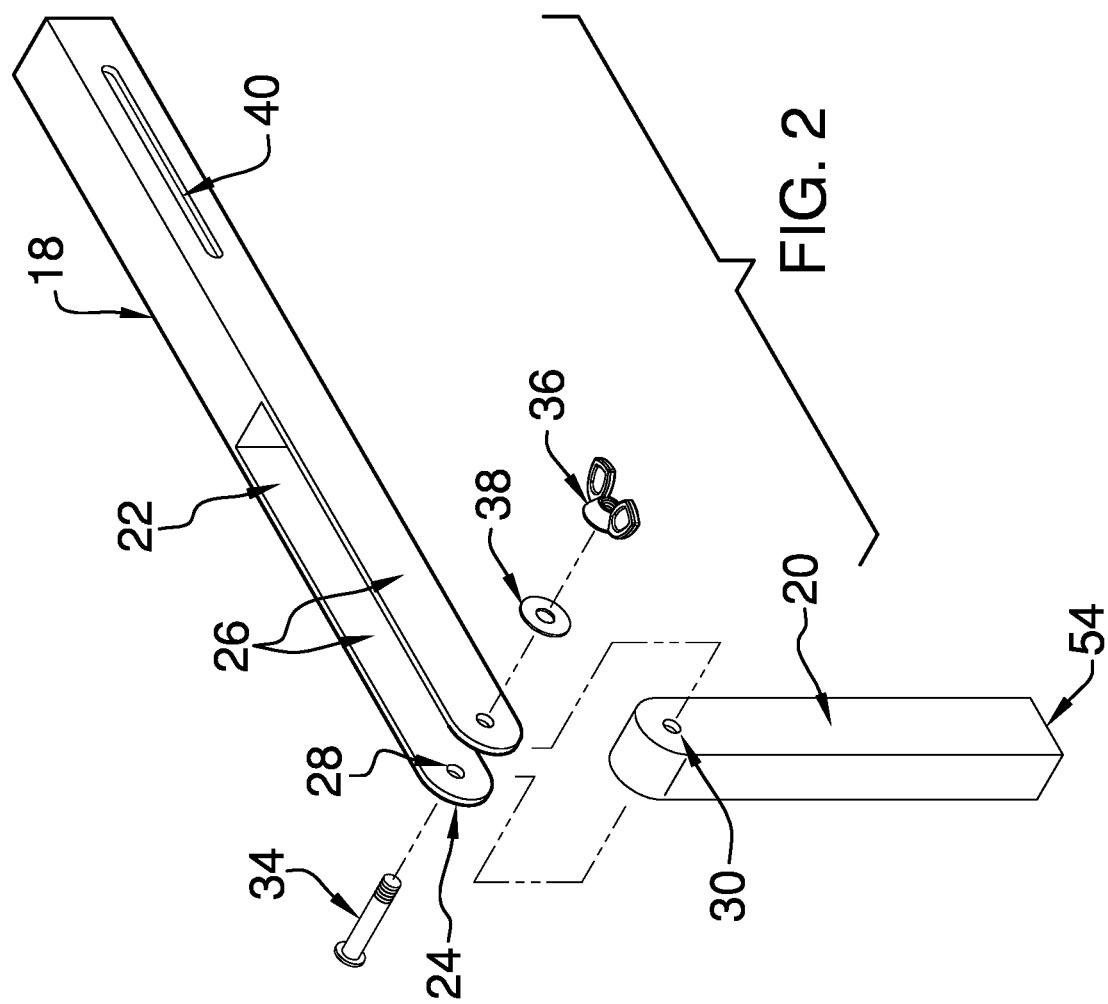
FIG. 2 is an exploded view of an embodiment of the disclosure.

Each opposed end 16 of the rod 14 is configured to both slidably engage and to fixedly engage a first segment 18 of a respective protractor 12, such that each opposed end 16 has a protractor 12 engaged proximately thereto with an associated first segment 18 extending linearly therefrom. Thus, the rod 14 and the first segments 18 have an adjustable and selectively fixable overall length. The rod 14 and the first segments 18 are configured to be positioned between a pair of surfaces, with each second segment 20 positioned flush to a respective surface. A user is positioned to fix the second segment 20 relative to the first segment 18 to provide a respective angle measurement and a length measurement between the surfaces. The user then is positioned to template the length measurement and the angle measurements onto a beam. The user then can cut the beam to length, with the ends of the beam angled so that the beam fits between the pair of surfaces The first segment 18 has a cutout 22 extending thereinto from a first terminus 24 thereof to define a pair of arms 26, as shown in FIG. 2. Each arm 26 has a hole 28 positioned therethrough proximate to the first terminus 24. The second segment 20 has a channel 30 positioned therethrough, so that the channel 30 is aligned with the holes 28. A fastener 32 is positioned through the holes 28 and the channel 30 so that the second segment 20 is pivotally engaged to the first segment 18. The fastener 32 is configured to selectively fixedly engage the second segment 20 to fix the second segment 20 relative to the first segment 18.

The fastener 32 may comprise a fastening bolt 34, a fastening thumbscrew 36, and at least one fastening washer 38. The present invention also anticipates the fastener 32 comprising other fastening means, such as, but not limited to, clamp fittings, cam locks, and the like. The present invention also anticipates the second segment 20 being pivotally engaged to the first segment 18 by other pivoting means, such as, but not limited to, hinges, pivot balls, and the like.

Figure 4:
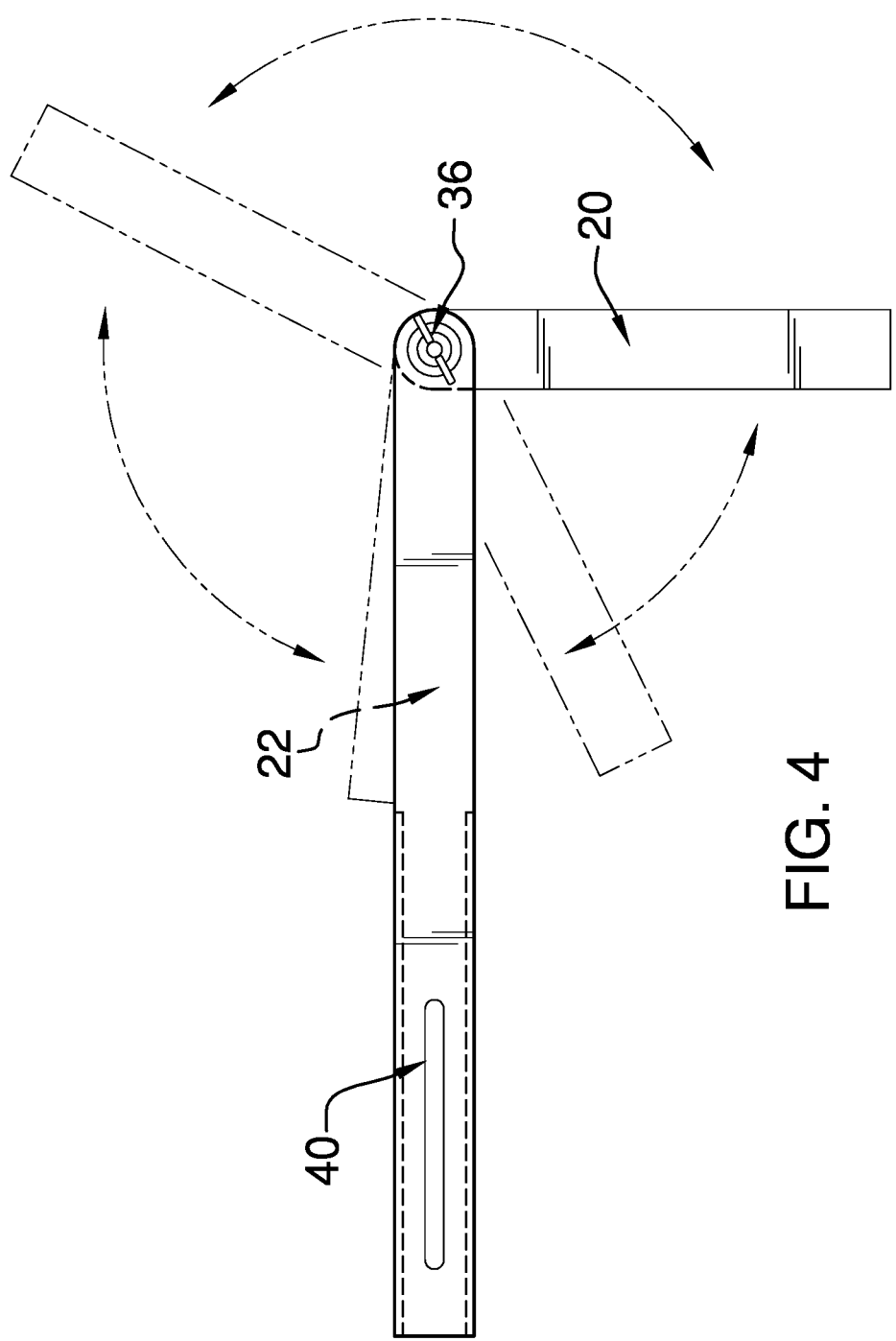
FIG. 4 is a side view of an embodiment of the disclosure.
Figure 5:
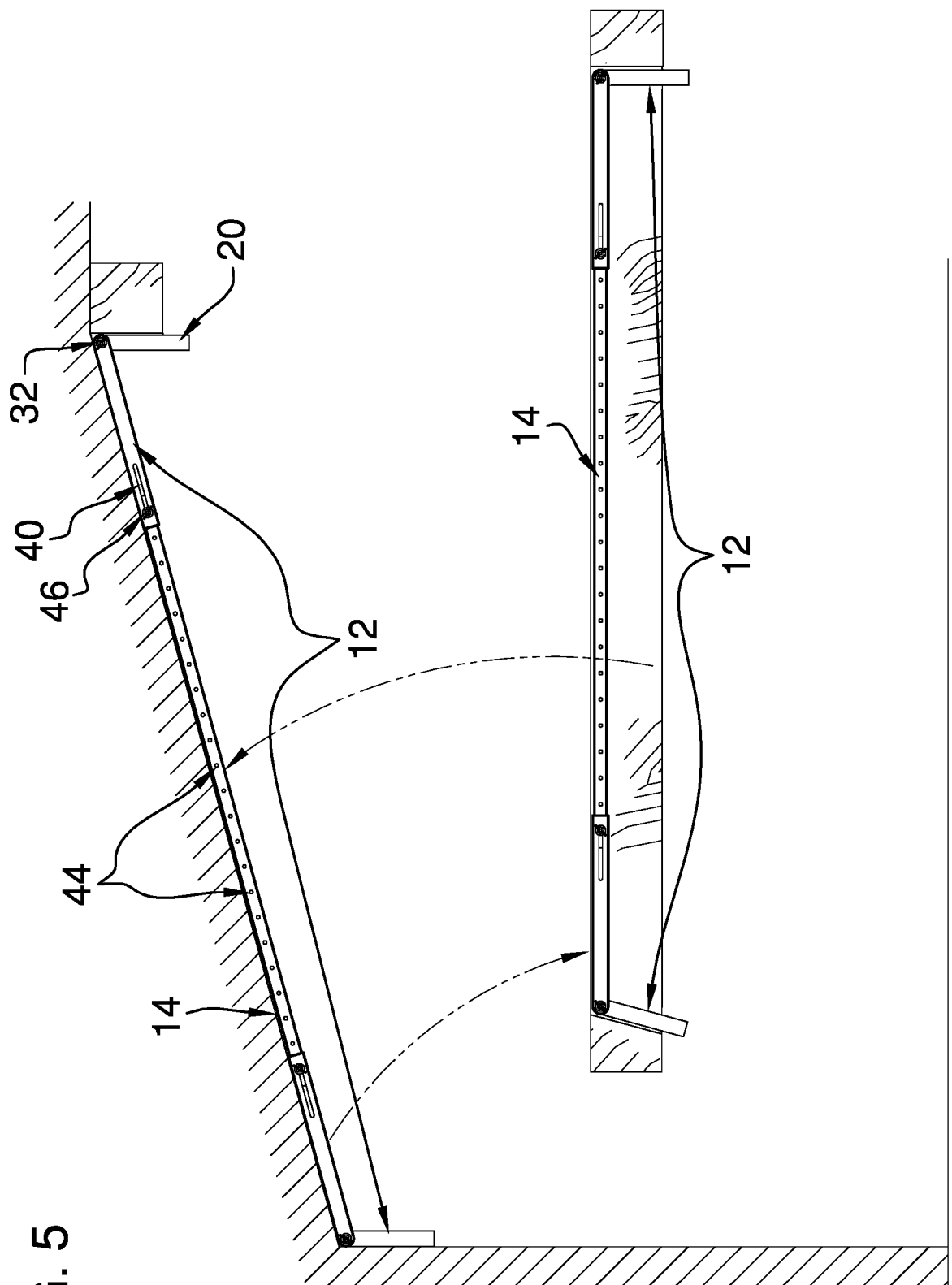
FIG. 5 is an in-use view of an embodiment of the disclosure.

The cutout 22 is complementary to the second segment 20 so that the second segment 20 is selectively pivotable to a stowed configuration, as demonstrated in FIG. 4, wherein the second segment 20 is positioned within the cutout 22. The second segment 20 being stowable facilitates transporting and storage of the templating device 10 when it is not in use.

Figure 3:
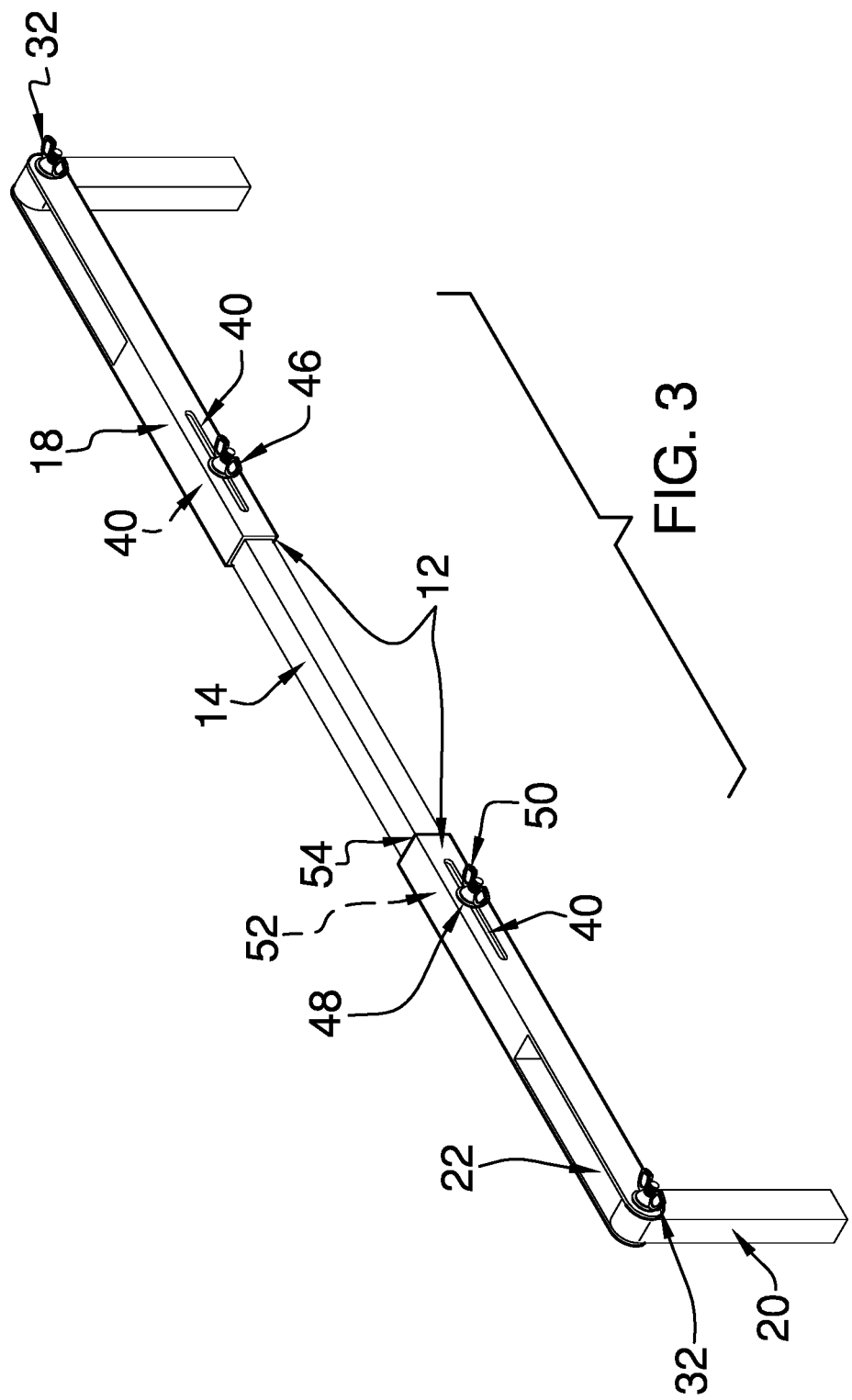
FIG. 3 is an isometric perspective view of an embodiment of the disclosure.

The rod 14 and the second segment 20 are tubular and are circumferentially disparate so that one is selectively insertable into the other. The second segment 20 may be circumferentially larger than the rod 14, as shown in FIG. 3, but the present invention also anticipates the rod 14 being circumferentially larger than the second segment 20 (not shown).

The first segment 18 has a first slot 40 positioned longitudinally therethrough as shown in FIG. 4. The rod 14 has at least one of a second slot 42 and a plurality of orifices 44 positioned therein, which is selectively alignable with the first slot 40 that is positioned in the first segment 18 of the protractor 12. A connector 46 is positionable through the first slot 40 and the at least one of the second slot 42 and the plurality of orifices 44 so that the first segment 18 is slidable engaged to the rod 14. The connector 46 is configured to selectively and fixedly engage the rod 14 to fixedly position the first segment 18 relative to the rod 14. Thus, the user is positioned to selectively position the first segments 18 relative to the rod 14 so that the rod 14 and the first segments 18 fit between the pair of surfaces, thereby providing the length measurement for the beam.

The connector 46 may comprise a connecting bolt 48, a connecting thumbscrew 50, and at least one connecting washer 52. The present invention also anticipates the connector 46 comprising other connecting means, such as, but not limited to, clamp fittings, cam locks, and the like.

Each of the rod 14 and the second segment 20 have a cross-sectional profile 54. The cross-sectional profiles 54 may be square, as shown in FIG. 3, or other shape, such as, but not limited to, rectangular, hexagonal, and the like.

The rod 14 and the protractors 12 are rigid so that the rod 14 and the first segments 18 are linear. The rod 14 and the protractors 12 may comprise metal, or other rigid material, such as, but not limited to, plastic, fiberglass, and the like.

In one embodiment (FIG. 1, bottom), the plurality of orifices 44 comprises four orifices 44, which are positioned two apiece proximate to each opposed end 16 of the rod 14. With the rod 14 slidably engaged to the first segments 18 of the protractors 12 the overall length the rod 14 and the first segments 18 is adjusted to fit between the pair of surfaces. Then, one each of the orifices 44 proximate to the opposed ends 16 are utilized for insertion and tightening of the connectors 46 to fixedly engage the rod 14 to the first segments 18, concurrently fixing the length measurement to be templated to the beam that is to be cut.

In another embodiment (FIG. 1, top), the plurality of orifices 44 comprises two orifices 44, which are positioned singly proximate to each opposed end 16 of the rod 14, and the second slot 42 extends substantially between the two orifices 44. One of the orifices 44 might be used with a connector 46 to fixedly engage one protractor 12 to the rod 14, while the other protractor 12 would be fixedly engaged to the rod 14 utilizing either the other orifice 44 or the second slot 42 and another connector 46. The rod 14 of this embodiment may be longer than the rod 14 of the previous embodiment, to allow for greater length measurements. In yet another embodiment (FIG. 1, middle), the plurality of orifices 44 extends substantially between the opposed ends 16 of the rod 14. The rod 14 of this embodiment may be substantially length equivalent to the rod 14 of the previous embodiment.

The present invention also anticipates the rod 14 comprising a plurality of nested sections so that the rod 14 is selectively extensible and fixedly length adjustable. Another iteration entails the rod 14 and the first segments 18 of the protractors 12 together comprising a plurality of nested sections.

In use, the rod 14 is slidably engaged to the first segments 18 of the protractors 12, using the connectors 46, so that the overall length the rod 14 and the first segments 18 is adjustable to a distance between the pair of surfaces. The connectors 46 then are tightened to fixedly engage the rod 14 to the first segments 18, concurrently fixing the length measurement for templating to the beam that is to be cut. With the rod 14 and the first segments 18 thus positioned between the pair of surfaces, the second segments 20 are positioned flush to the surfaces and the fasteners 32 are tightened to fix the second segments 20 relative to the first segments 18, providing the angle measurements for templating to the beam.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A templating device comprising:
   a pair of protractors, each protractor comprising a first segment pivotally engaged to a second segment, the second segment being selectively fixably positionable relative to the first segment;

a rod having opposed ends, each opposed end being configured both for slidably engaging and for fixedly engaging a first segment of a respective protractor, such that each opposed end has a protractor engaged proximately thereto with an associated first segment extending linearly therefrom, such that the rod and the first segments have an adjustable and selectively fixable overall length, wherein the rod and the first segments are configured for positioning between a pair of surfaces such that each second segment is positioned flush to a respective surface, positioning a user for fixing the second segment relative to the first segment to provide a respective angle measurement and a length measurement between the surfaces, positioning the user to template the length measurement and the angle measurements onto a beam, enabling the user to cut the beam to length with the ends of the beam angled so that the beam fits between the pair of surfaces;

the first segment having a cutout extending thereinto from a first terminus thereof defining a pair of arms, each arm having a hole positioned therethrough proximate to the first terminus, the second segment having a channel positioned therethrough, such that the channel is aligned with the holes; and a fastener positioned through the holes and the channel such that the second segment is pivotally engaged to the first segment, the fastener being configured for selectively fixedly engaging the second segment for fixing the second segment relative to the first segment.

2. The templating device of claim 1, wherein the fastener comprises a fastening bolt, a fastening thumbscrew, and at least one fastening washer.

3. The templating device of claim 1, wherein the cutout is complementary to the second segment such that the second segment is selectively pivotable to a stowed configuration wherein the second segment is positioned within the cutout.

4. The templating device of claim 1, further including:
the rod and the second segment being tubular, the rod and the second segment being circumferentially disparate such that one is selectively insertable into the other;
the first segment having a first slot positioned longitudinally therethrough;
the rod having at least one of a second slot and a plurality of orifices positioned therein and being selectively alignable with the first slot positioned in the first segment of the protractor; and
a connector positionable through the first slot and the at least one of the second slot and the plurality of orifices such that the first segment is slidable engaged to the rod, the connector being configured for selectively fixedly engaging the rod for fixedly positioning the first segment relative to the rod.

5. The templating device of claim 4, wherein the connector comprises a connecting bolt, a connecting thumbscrew, and at least one connecting washer.

6. The templating device of claim 4, wherein the second segment is circumferentially larger than the rod.

7. The templating device of claim 4, wherein each of the rod and the second segment have a cross-sectional profile, the cross-sectional profiles being square.

8. The templating device of claim 4, wherein the rod and the protractors comprise metal.

9. The templating device of claim 4, wherein the plurality of orifices comprises four orifices positioned two apiece proximate to each opposed end of the rod.

10. The templating device of claim 4, wherein the plurality of orifices comprises two orifices positioned singly proximate to each opposed end of the rod, the second slot extending substantially between the two orifices.

11. The templating device of claim 4, wherein the plurality of orifices extends substantially between the opposed ends of the rod.

12. A templating device comprising:
a pair of protractors, each protractor comprising a first segment pivotally engaged to a second segment, the second segment being selectively fixably positionable relative to the first segment;

a rod having opposed ends, each opposed end being configured both for slidably engaging and for fixedly engaging a first segment of a respective protractor, such that each opposed end has a protractor engaged proximately thereto with an associated first segment extending linearly therefrom, such that the rod and the first segments have an adjustable and selectively fixable overall length, wherein the rod and the first segments are configured for positioning between a pair of surfaces such that each second segment is positioned flush to a respective surface, positioning a user for fixing the second segment relative to the first segment to provide a respective angle measurement and a length measurement between the surfaces, positioning the user to template the length measurement and the angle measurements onto a beam, enabling the user to cut the beam to length with the ends of the beam angled so that the beam fits between the pair of surfaces; and wherein the rod and the protractors are rigid such that the rod and the first segments are linear.

13. A templating device comprising:
a pair of protractors, each protractor comprising a first segment pivotally engaged to a second segment, the second segment being selectively fixably positionable relative to the first segment, the first segment having a cutout extending thereinto from a first terminus thereof defining a pair of arms, each arm having a hole positioned therethrough proximate to the first terminus, the second segment having a channel positioned therethrough, such that the channel is aligned with the holes, the cutout being complementary to the second segment such that the second segment is selectively pivotable to a stowed configuration wherein the second segment is positioned within the cutout, the first segment having a first slot positioned longitudinally therethrough;

a fastener positioned through the holes and the channel such that the second segment is pivotally engaged to the first segment, the fastener being configured for selectively fixedly engaging the second segment for fixing the second segment relative to the first segment, the fastener comprising a fastening bolt, a fastening thumbscrew, and at least one fastening washer;

a rod having opposed ends, each opposed end being configured both for slidably engaging and for fixedly engaging a first segment of a respective protractor, such that each opposed end has a protractor engaged proximately thereto with an associated first segment extending linearly therefrom, such that the rod and the first segments have an adjustable and selectively fixable overall length, wherein the rod and the first segments are configured for positioning between a pair of surfaces such that each second segment is positioned flush to a respective surface, positioning a user for fixing the second segment relative to the first segment to provide a respective angle measurement between the surfaces, positioning the user to template the length measurement and the angle measurements onto a beam, enabling the user to cut the beam to length with the ends of the beam angled so that the beam fits between the pair of surfaces, the rod and the second segment being tubular, the rod and the second segment being circumferentially disparate such that one is selectively insertable into the other, the second segment being circumferentially larger than the rod, each of the rod and the second segment having a cross-sectional profile, the cross-sectional profiles being square, the rod having at least one of a second slot and a plurality of orifices positioned therein and being selectively alignable with the first slot positioned in the first segment of the protractor, the rod and the protractors being rigid such that the rod and the first segments are linear, the rod and the protractors comprising metal; and a connector positionable through the first slot and the at least one of the second slot and the plurality of orifices such that the first segment is slidable engaged to the rod, the connector being configured for selectively fixedly engaging the rod for fixedly positioning the first segment relative to the rod, the connector comprising a connecting bolt, a connecting thumbscrew, and at least one connecting washer.

14. The templating device of claim 13, wherein the plurality of orifices comprises four orifices positioned two apiece proximate to each opposed end of the rod.

15. The templating device of claim 13, wherein the plurality of orifices comprises two orifices positioned singly proximate to each opposed end of the rod, the second slot extending substantially between the two orifices.

16. The templating device of claim 13, wherein the plurality of orifices extends substantially between the opposed ends of the rod.

\* \* \* \* \*